W. CLIFFORD.
SHAFT PACKING.
APPLICATION FILED DEC. 26, 1911.

1,032,187.

Patented July 9, 1912.

WITNESSES
H. A. Pattison
C. P. Wright, Jr.

INVENTOR
William Clifford
BY A. Pattison
ATTORNEY

UNITED STATES PATENT OFFICE.

WILLIAM CLIFFORD, OF DULUTH, MINNESOTA.

SHAFT-PACKING.

1,032,187.   Specification of Letters Patent.   Patented July 9, 1912.

Application filed December 26, 1911. Serial No. 667,771.

*To all whom it may concern:*

Be it known that I, WILLIAM CLIFFORD, a citizen of the United States, residing at Duluth, in the county of St. Louis and State of Minnesota, have invented certain new and useful Improvements in Shaft-Packings, of which the following is a specification, reference being had therein to the accompanying drawing.

My invention relates to improvements in shaft packings, and pertains more particularly to a packing used on the shaft of a centrifugal pump.

The object of my invention is to produce a flexible packing in order to admit of a considerable vibration of the shaft and at the same time maintain an airtight joint with the shaft.

Another object of my invention is to provide a packing of this character which will prevent the entrance of sand and grit between the packing and shaft and having certain details of structure hereinafter fully set forth.

Figure 1:
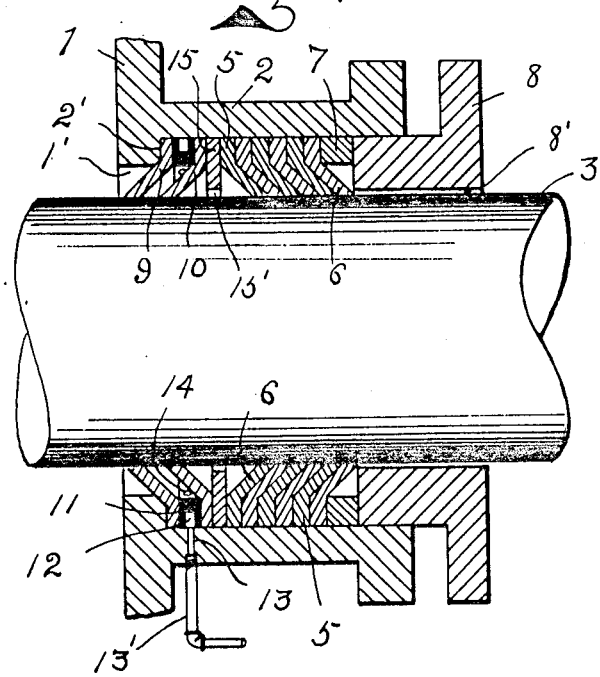
Figure 2:
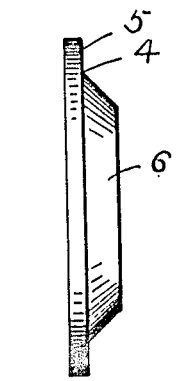

In the accompanying drawing—Figure 1 is a longitudinal vertical sectional view of the end of the centrifugal pump showing the shaft and my improved packing applied thereto. Fig. 2 is a side elevation of one of my improved packing rings.

Referring now to the drawings, 1 represents the outer or lower wall of a centrifugal pump having formed thereon a laterally extending stuffing box 2, and through which the shaft 3 passes. The wall 1 of the pump is provided with an opening 1', which is of a diameter considerably greater than that of the shaft 3, whereby the shaft is allowed to vibrate, which is essential in shafts of this character.

The stuffing box 2, forms a shoulder 2' at its inner end against which the packing rings are adapted to abut, as clearly shown in Fig. 1 of the drawings. The packing rings 4, are preferably made of flexible material and formed with the outer flat rims 5, the outer peripheries of which engage the inner wall of the stuffing box 2. The inner ends of the flat rims 5 are provided with conically shaped rims 6, the inner ends of which engage the outer periphery of the shaft 3. The conically shaped rims 6 engaging the shaft allow of the vibration of the shaft which is the case in centrifugal pumps and which, at the same time, form a tight joint with the shaft. Within the stuffing box 2 is a follower ring 7, which is of a width equal to that of the flat rims 5 of the washers, whereby the washers are clamped together by means of the stuffing gland 8, which extends within the stuffing box and is clamped in said position by any desired means. The follower ring 7, as heretofore stated and shown in the drawings, being of a width equal to that of the rims 5 of the washers allows the lower conically shaped rim 6 of the washers to readily move outwardly and yet tightly fitting the shaft. The stuffing gland 8 is provided with an opening 8' through which the shaft extends and said opening being of a greater diameter than the shaft to allow the shaft to readily vibrate. As shown in Fig. 1 of the drawings, I have provided a series of these particularly shaped washers which bear one against the other and form a large flat bearing surface for the shaft to absolutely prevent any leakage of air around the shaft. The innermost washer of the series engages an intermediate ring 15, which bears only against the flat rim 5 of the innermost washer. This ring 15 is provided with an opening 15' through which the shaft passes and which is of a diameter considerably greater than that of the shaft. Within the stuffing box 2, on the opposite side of the ring 15 is a washer 10, precisely the same in structure as that of the washer on the opposite side of the ring only having the conically shaped portions 6, extending in the opposite direction. Within the stuffing box 2 and having its flat rim 5, abutting against the shoulder 2', is a second ring 9 which has its conical portion 6 extending in the same direction as that of the ring 10. These rings 9 and 10, as shown, are spaced apart by a ring 11, which has in its outer periphery an annular groove 12, communicating with an opening 13 in the stuffing box and to which is connected a pipe 13', whereby water is supplied to the annular groove 12. The ring 11, as shown in Fig. 1 of the drawings, is provided with a series of openings 14 communicating with the annular groove 12, whereby the space between the rings 9 and 10 may be supplied with water for washing any grit that may pass the ring 9 to prevent it from getting between the rings at the opposite ends of the stuffing box and the shaft.

While I have described the packing rings as made of leather and have shown them solid, it will be understood that they can be made of any material and, if desired, split so as to be flexible to accomplish the same result as a leather or rubber ring.

Having thus described my invention, what I claim and desire to secure by Letters Patent is:—

1. A flexible packing, comprising a stuffing box having two spaced packing rings and a water-supply for the space between the packing rings and adapted to force any grit from between the packing rings.

2. A flexible packing, comprising a stuffing box having packing rings, and a combined spacing and water supply ring between the two spaced packing rings.

3. A flexible packing, comprising a stuffing box having packing rings, and a combined spacing and water supply ring between the outer ends of the packing rings.

4. A flexible packing, comprising a stuffing box having packing rings formed with flat outer rims engaging the stuffing box and conically shaped inner rims engaging the shaft, and a combined spacing and water supply ring between flat outer rims of the packing rings.

5. The combination with a shaft, of a stuffing box surrounding the shaft, of abutting packing rings within the stuffing box and having conically shaped inner ends engaging the shaft, and two spaced packing rings having a water supply between the same and having their conical portions extending in the opposite direction to that of the other rings.

6. The combination with a shaft, of a stuffing box surrounding the shaft and having two packing rings therein and engaging the shaft, and means for supplying water between the packing rings for the purpose described.

7. The combination with a shaft of a stuffing box surrounding the shaft, of flexible packing rings within the stuffing box and having conically shaped inner edges engaging the shaft, and means for engaging the outer flat edges of the flexible rings for clamping the same within the stuffing box.

8. The combination with a shaft, of a stuffing box surrounding the shaft, packing rings within the shaft and having radial outer rims, and conically shaped inner rims engaging the shaft, a follower ring engaging the radial rim of the outermost ring, and a stuffing gland engaging the follower ring.

9. The combination with a shaft, of a stuffing box surrounding the shaft, flexible rings within the box and engaging the shaft, means for clamping the rings within the box, spaced packing rings within the box at its inner end, and a water supply for the said space whereby the grit and dirt is washed from between the said rings.

10. The combination with a shaft, of a stuffing box surrounding the shaft, conically arranged flexible rings in the outer end of the stuffing box and extending in one direction, conically shaped rings in the opposite end of the stuffing box and extending in the opposite direction and spaced apart, and a water supply for the space between the said spaced rings for the purpose described.

11. The combination with a shaft of a stuffing box surrounding the shaft, packing rings within one end of the stuffing box and having radially arranged outer rims and conically shaped inner rims engaging the shaft, a radially arranged divisional ring engaging the innermost packing ring, two spaced packing rings within the stuffing box on the inside of the divisional ring, an annular grooved ring between the spaced packing rings, means for clamping said packing rings within the stuffing box, and a water supply for the annular grooved ring for supplying water to the space between the two innermost rings for the purpose described.

12. The combination with a shaft, with a stuffing box surrounding the shaft, packing rings within the said stuffing box and having conically shaped inner rims engaging the shaft, a follower ring engaging the outer face of the outermost ring, a stuffing gland engaging the follower ring, two spaced packing rings within the inner end of the stuffing box and having conically shaped inner rims extending in the opposite direction to the rings carried by the opposite end of the stuffing box, an annular grooved ring between the said spaced packing rings, a water supply through the stuffing box and communicating with the annular groove within the ring, the inner periphery of the ring having openings communicating with the space between the spaced rings, for the purpose described.

13. The combination with a shaft, of a stuffing box surrounding the shaft, packing rings within the stuffing box and having flexible inner ends engaging the shaft, and means for supplying water between the two innermost packing rings for the purpose described.

14. The combination with a shaft, of a stuffing box surrounding the shaft, packing rings within one end of the stuffing box and having radially arranged outer rims and conically shaped inner rims engaging the shaft, a follower ring engaging the ratchet rims, two spaced packing rings within the stuffing box and having conically shaped rims engaging the shaft and extending in the opposite direction to the packing rings at the opposite ends, and water supply for the space between the two spaced rings for the purpose described.

In testimony whereof I hereunto affix my signature in the presence of two witnesses.

WILLIAM CLIFFORD.

Witnesses:
G. F. ROECKER,
S. GEO. STEVENS.

Copies of this patent may be obtained for five cents each, by addressing the "Commissioner of Patents, Washington, D. C."